United States Patent
Fang et al.

(10) Patent No.: US 12,093,202 B2
(45) Date of Patent: Sep. 17, 2024

(54) DBI ENCODING DEVICE AND DBI ENCODING METHOD

(71) Applicants: Global Unichip Corporation, Hsinchu (TW); Taiwan Semiconductor Manufacturing Company, Ltd., Hsinchu (TW)

(72) Inventors: Yung-Sheng Fang, Hsinchu (TW); Igor Elkanovich, Hsinchu (TW); Pei Yu, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 3 days.

(21) Appl. No.: 18/079,001

(22) Filed: Dec. 12, 2022

(65) Prior Publication Data

US 2024/0193114 A1    Jun. 13, 2024

(51) Int. Cl.
*G06F 13/40*    (2006.01)

(52) U.S. Cl.
CPC ................... *G06F 13/40* (2013.01)

(58) Field of Classification Search
CPC ........................................................ G06F 13/40
See application file for complete search history.

(56) References Cited

U.S. PATENT DOCUMENTS

| | | | | |
|---|---|---|---|---|
| 8,706,958 B2* | 4/2014 | Hein | ...................... | G11C 5/148 |
| | | | | 711/104 |
| 9,922,686 B2* | 3/2018 | Hollis | ...................... | G11C 5/04 |
| 10,146,719 B2* | 12/2018 | Kondo | ................. | G11C 29/025 |
| 10,964,702 B2* | 3/2021 | Narui | .................. | G11C 11/4093 |
| 2002/0124030 A1* | 9/2002 | Enam | ...................... | H03L 7/091 |
| | | | | 708/102 |

(Continued)

FOREIGN PATENT DOCUMENTS

| | | |
|---|---|---|
| TW | 201732623 | 9/2017 |
| TW | 202030598 | 8/2020 |

(Continued)

OTHER PUBLICATIONS

"Notice of allowance of Taiwan Counterpart Application", issued on Jul. 28, 2023, p. 1-p. 4.

*Primary Examiner* — Henry Tsai
*Assistant Examiner* — Aurangzeb Hassan
(74) *Attorney, Agent, or Firm* — JCIPRNET (57) ABSTRACT

The disclosure provides a data bus inversion (DBI) encoding device and a DBI encoding method. The DBI encoding device includes a comparator circuit, a first controllable inverting circuit and a second controllable inverting circuit. The comparator circuit checks the number of the different bits between a first raw data and a second raw data. Based on the number of the different bits, the first controllable inversion circuit determines whether to invert a first DBI bit corresponding to the first raw data as a second DBI bit corresponding to the second raw data. The second controllable inversion circuit determines, based on the second DBI bit, whether to adopt the second raw data as a second encoded data corresponding to the second raw data, or invert the second raw data to generate the second encoded data.

18 Claims, 5 Drawing Sheets

(56) References Cited

U.S. PATENT DOCUMENTS

| | | | | |
|---|---|---|---|---|
| 2015/0324261 A1* | 11/2015 | Hollis | ............... | G06F 11/3041 |
| | | | | 714/43 |
| 2023/0266891 A1* | 8/2023 | Tao | ..................... | G11C 5/063 |
| | | | | 713/324 |

FOREIGN PATENT DOCUMENTS

| TW | 202147327 | 12/2021 |
|---|---|---|
| TW | 202211215 | 3/2022 |

* cited by examiner

DBI ENCODING DEVICE AND DBI ENCODING METHOD

BACKGROUND

Technical Field

The disclosure relates to data encoding, and particularly relates to a data bus inversion (DBI) encoding device and a DBI encoding method.

Description of Related Art

Data bus inversion (DBI) is a conventional bus encoding technique. The DBI coding technique is capable of reducing the number of data bit transitions of a data bus, thereby reducing the power consumption of a transmitter circuit for changing the logic state of data bits. The DBI encoding technique uses an extra bit referred to as a control bit (or DBI bit) to perform DBI encoding on a group of data bits. The DBI bit indicates whether the current encoded data transmitted by the bus is in an original bit form or an inverted bit form. Conventionally, a DBI encoding circuit compares/checks the different bit number between the current encoded data (first encoded data) transmitted by the bus and the next raw data (second raw data). Based on the different bit number, the DBI encoding circuit may determine whether to invert the second raw data to generate the next encoded data (second encoded data). The transmitter circuit may transmit the second encoded data and the DBI bit to a receiver circuit via the bus. Based on the DBI bit, the receiver circuit learns whether the current encoded data (first encoded data) transmitted by the bus is in the original bit form or the inverted bit form. If the DBI bit indicates that the first encoded data is in the inverted bit form, the receiver circuit may invert the first encoded data from the bus to obtain the first raw data. If the DBI bit indicates that the first encoded data is in the original bit form, the receiver circuit may adopt the first encoded data from the bus as the first raw data.

For example, assuming that the first encoded data is "0000 0000" and the second raw data is "1111 1111", the different bit number is 8. Based on the different bit number "8", the DBI encoding circuit may determine to invert "1111 1111" to generate "0000 0000" as the second encoded data. The transmitter circuit may transmit the second encoded data "0000 0000" and the DBI bit "1" to the receiver circuit via the bus. The bus may transmit the first encoded data "0000 0000" at a first time, and transmits the second encoded data "0000 0000" at a second time. Therefore, none of the 8 data bits of the bus is inverted in the period of first time to second time. Based on the DBI bit "1", the receiver circuit may invert the second encoded data "0000 0000" from the bus to obtain the second raw data "1111 1111". Then, assuming that the third raw data is "0101 0100", the different bit number between the second encoded data "0000 0000" and the next raw data (i.e., the third raw data "0101 0100") is 3. Based on the different bit number "3", the DBI encoding circuit may determine to adopt the third raw data "0101 0100" as the third encoded data. The transmitter circuit may transmit the third encoded data "0101 0100" and the DBI bit "0" to the receiver circuit via the bus. The bus may transmit the second encoded data "0000 0000" at the second time, and transmits the third encoded data "0101 0100" at a third time. Therefore, 3 data bits of the bus are inverted in the period of second time to third time. Based on the DBI bit "0", the receiver circuit may adopt the third encoded data "0101 0100" from the bus as the third raw data.

Based on the above description, it is known that the conventional DBI encoding circuit needs to wait until "comparison between the first encoded data and the second raw data" is completed and the second encoded data is determined to perform "comparison between the second encoded data and the third raw data". Even if multiple raw data enter the DBI encoding circuit at the same time, the conventional DBI encoding circuit requires multiple delay times to carry out "comparison between previous encoded data and current raw data" in a stage-by-stage manner, so as to complete the DBI encoding operation of the multiple raw data. Thus, further efforts are required to facilitate the DBI encoding operation for multiple raw data.

It should be noted that the contents disclosed in the "Description of Related Art" section is used for enhancement of understanding of the disclosure. A part of the contents (or all of the contents) disclosed in the "Description of Related Art" section may not pertain to the conventional technology known to people having ordinary skill in the art. The information disclosed in the "Description of Related Art" section does not mean that the content is known to people having ordinary skill in the art before the filing of the disclosure.

SUMMARY

An aspect of the disclosure provides a data bus inversion (DBI) encoding device and a DBI encoding method performing DBI encoding on a plurality of raw data to generate a plurality of encoded data.

According to an embodiment of the disclosure, the DBI encoding device includes a first comparator circuit, a first controllable inversion circuit, and a second controllable inversion circuit. The first comparator circuit is configured to check a first different bit number between a first raw data and a second raw data in the plurality of raw data, and compare the first different bit number with a first reference value to obtain a first comparison result. The first controllable inversion circuit is coupled to the first comparator circuit to receive the first comparison result. The first controllable inversion circuit receives a first DBI bit corresponding to the first raw data and outputs a second DBI bit corresponding to the second raw data. The first controllable inversion circuit determines, based on the first comparison result, whether to adopt the first DBI bit as the second DBI bit or invert the first DBI bit to generate a first inverted bit as the second DBI bit. The second controllable inversion circuit is coupled to the first controllable inversion circuit to receive the second DBI bit. The second controllable inversion circuit receives the second raw data and outputs a second encoded data corresponding to the second raw data. The second controllable inversion circuit determines, based on the second DBI bit, whether to adopt the second raw data as the second encoded data or invert the second raw data to generate a first inverted data as the second encoded data.

According to another embodiment of the disclosure, the DBI encoding method includes: checking a first different bit number between a first raw data and a second raw data in the plurality of raw data; comparing the first different bit number and a first reference value to obtain a first comparison result; determining, based on the first comparison result, whether to adopt a first DBI bit corresponding to the first raw data as a second DBI bit corresponding to the second raw data or invert the first DBI bit to generate a first inverted bit as the second DBI bit; and determining, based on the second DBI bit, whether to adopt the second raw data as a second encoded data corresponding to the second raw data or invert the second raw data to generate a first inverted data as the second encoded data.

Based on the above, the DBI encoding device according to the embodiments of the disclosure compares the previous raw data and the current raw data, instead of comparing the previous encoded data and the current raw data. Therefore, the DBI encoding device does not need to wait for a decision/encoding on the previous encoded data. When the multiple raw data enter the DBI encoding device at the same time, the DBI encoding device may compare the multiple raw data at the same time to perform DBI encoding to generate the multiple encoded data.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The term "coupled to (or connected to)" used in the entire disclosure (including claims) refers to any direct or indirect connecting means. For instance, if the disclosure describes a first apparatus is coupled to (or connected to) a second apparatus, the description should be explained as the first apparatus is connected directly to the second apparatus, or the first apparatus, through connecting other apparatus or using certain connecting means, is connected indirectly to the second apparatus. In addition, terms such as "first" and "second" in the entire specification (including claims) are used only to name the elements or to distinguish different embodiments or scopes and should not be construed as the upper limit or lower limit of the number of any element and should not be construed to limit the order of the elements. Moreover, elements/components/steps with the same reference numerals represent the same or similar parts in the figures and embodiments where appropriate. Descriptions of the elements/components/steps with the same reference numerals or terms in different embodiments may be references for one another.

Figure 1:
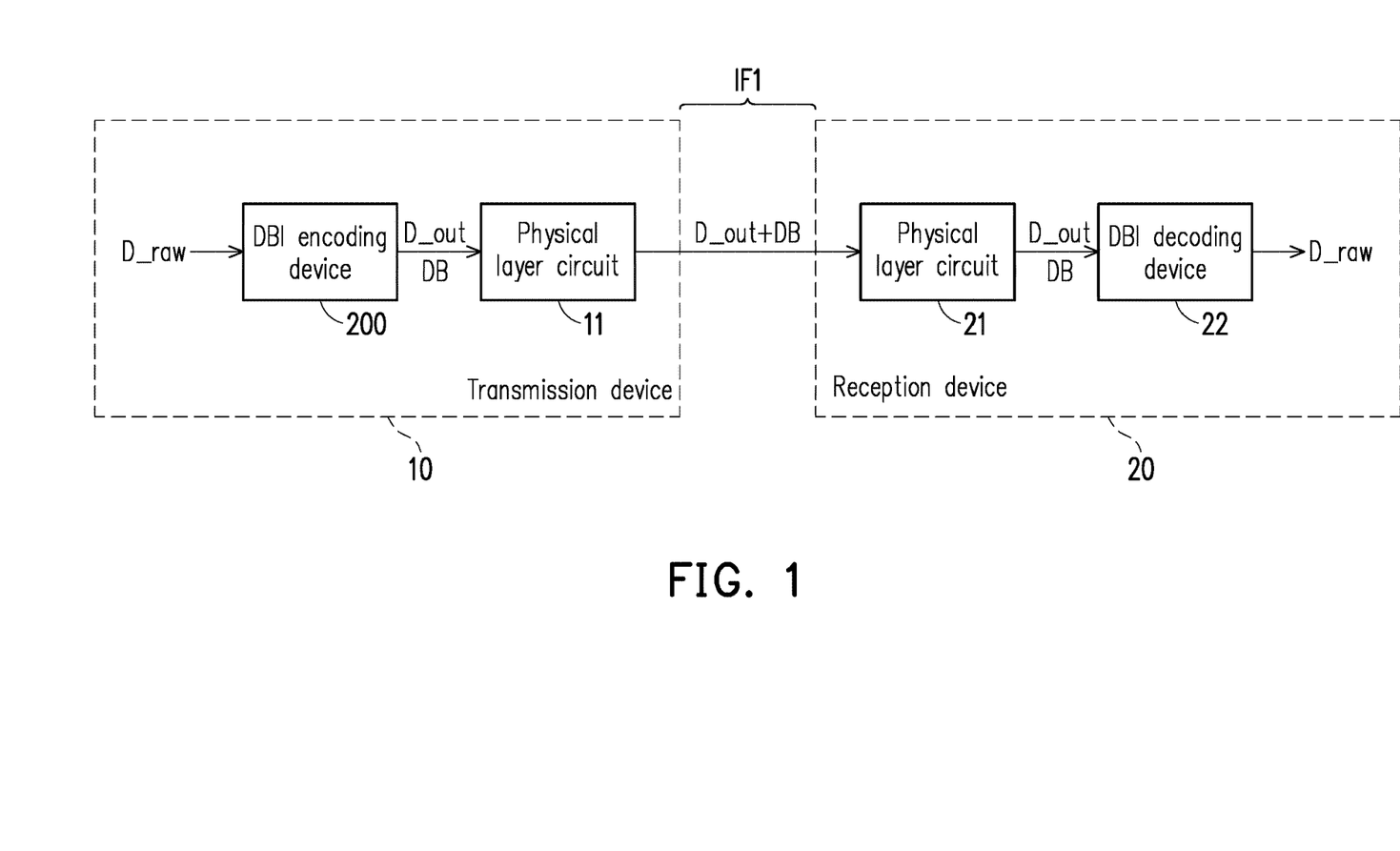
FIG. 1 is a schematic circuit block diagram illustrating a communication system according to an embodiment of the disclosure.

FIG. 1 is a schematic circuit block diagram illustrating a communication system according to an embodiment of the disclosure. The communication system shown in FIG. 1 includes a transmission device 10 and a reception device 20. The embodiment is not particularly limited by the product types of the transmission device 10 and the reception device 20. For example, based on practical design, the transmission device 10 and/or the reception device 20 may be a die, a chip, an integrated circuit, an electronic device, or other device(s)/component(s). A die (e.g., a processor die or an application specific integrated circuit (ASIC) die) may be connected with one or more dies via a communication interface. For example, the die may be a processor die, an ASIC die, a serializer-deserializer (SerDes) die, or other dies. An ASIC die may be connected with one or more SerDes dies for various peripheral communications. The ASIC die and the SerDes dies may be connected with each other via a routing structure (a wire and a contact element) in an interposer layer or a redistribution layer (RDL), thereby realizing a chip-on-wafer-on-substrate (CoWoS) platform or an integrated fan-out (InFO) platform.

The transmission device 10 may be connected to the reception device 20 via a communication interface IF1. Based on practical design and application, in an embodiment in which the transmission device 10 and the reception device 20 are two dies, the communication interface IF1 may be any interface regulated by a small die-to-die interconnect standard For example, the communication interface IF1 may be an interface compliant with the Universal Chiplet Interconnect Express (UCIe) standard.

The transmission device 10 may transmit a data unit stream to the reception device 20 via a data channel of the communication interface IF1. In general, to reduce the power consumption resulting from bit inversion, a data bus inversion (DBI) encoding device 200 of the transmission device 10 may perform DBI encoding on multiple raw data, so as to convert the multiple raw data D_raw into multiple encoded data D_out and multiple DBI data bits DB. For example, the DBI encoding device 200 may compare a first raw data D_raw[1] and a second raw data D_raw[2], and determine, based on a comparison result, whether to adopt the second raw data D_raw[2] as second encoded data D_out[2] or invert the second raw data D_raw[2] to generate inverted data as the second encoded data D_out[2]. The DBI encoding device 200 compares previous raw data and current raw data, instead of comparing previous encoded data and current raw data. Therefore, the DBI encoding device 200 does not need to wait for a decision/encoding on the previous encoded data. When the multiple raw data D_raw enter the DBI encoding device 200 at the same time, the DBI encoding device 200 may compare the multiple raw data D_raw at the same time to perform DBI encoding to generate the multiple encoded data D_out.

A physical layer circuit 11 of the transmission device 10 may transmit the encoded data D_out and the DBI bit DB to the reception device 20. After a physical layer circuit 21 of the reception device 20 receives the encoded data D_out and the DBI bit DB from the transmission device 10, a DBI decoding device 22 of the reception device 20 may perform DBI decoding on the encoded data D_out based on the DBI bit DB to restore the raw data D_raw.

For example, Table 1 provides a specific example of the raw data D_raw, the encoded data D_out, and the DBI bit DB. The DBI encoding device 200 may perform DBI encoding, so as to convert the raw data D_raw shown in Table 1 into the encoded data D_out and the DBI bit DB. The DBI bit DB may indicate whether the current encoded data transmitted via the bus (communication interface IF1) is in an original bit form or an inverted bit form. According to Table 1, the data bit DB[1] of the first encoded data D_out[1] is "0", indicating that the first encoded data D_out[1] is in the original bit form. That is, the first encoded data D_out[1]

is the same as the first raw data D_raw[1]. The DBI encoding device 200 may compare the first raw data D_raw[1] "0000 0000" and the second raw data D_raw[2] "111 1111", and determine, based on the comparison result, to invert the second raw data D_raw[2] to generate the inverted data "0000 0000" as the second encoded data D_out[2]. The physical layer circuit 11 may transmit the second encoded data D_out[2] "0000 0000" and the second DBI bit DB[2] "1" to the transmission device 20, wherein the second DBI bit DB[2] "1" indicates that the second encoded data D_out[2] is in an inverted bit form. After the physical layer circuit 21 receives the second encoded data D_out[2] "0000 0000" and the second DBI bit DB[2] "1" from the transmission device 10, the DBI decoding device 22 may, based on the second DBI bit DB[2] "1", perform DBI decoding (bit inversion) on the second encoded data D_out[2] "0000 0000" to generate/restore the second raw data D_raw[2].

TABLE 1

Specific Example of Raw Data and Encoded Data

|     | D_raw     | D_out     | DB |
|-----|-----------|-----------|----|
| [1] | 0000 0000 | 0000 0000 | 0  |
| [2] | 1111 1111 | 0000 0000 | 1  |
| [3] | 0101 0100 | 0101 0100 | 0  |
| [4] | 1010 1110 | 0101 0001 | 1  |
| [5] | 1011 1000 | 0100 0111 | 1  |
| [6] | 0000 0000 | 1111 1111 | 1  |
| [7] | 0000 0010 | 1111 1101 | 1  |
| [8] | 0100 0110 | 1011 1001 | 1  |

The DBI encoding device 200 may compare the second raw data D_raw[2] "1111 1111" and the third raw data D_raw[3] "0101 0100", and determine, based on the comparison result, to adopt the third raw data D_raw[3] "0101 0100" as the third encoded data D_out[3]. The physical layer circuit 11 may transmit the third encoded data D_out[3] "0101 0100" and the third DBI bit DB[3] "0" to the transmission device 20. After the physical layer circuit 21 receives the third encoded data D_out[3] "0101 0100" and the third DBI bit DB[3] "0" from the transmission device 10, the DBI decoding device 22 may, based on the third DBI bit DB[3] "0", perform DBI decoding (no inversion) on the third encoded data D_out[3] "0101 0100" to generate/restore the third raw data D_raw[3]. Other encoded data D_out[4] to D_out[8] and other DBI bits DB[4] to DB[8] shown in Table 1 may be processed with the same logic based on relevant descriptions of the encoded data D_out[1] to D_out[3] and DBI bits DB[1] to DB[3]. Therefore, details in this regard will not be repeated in the following.

Based on the above, the DBI encoding device 200 compares the previous raw data and the current raw data, instead of comparing the previous encoded data and the current raw data. Therefore, the DBI encoding device 200 does not need to wait for a decision/encoding on the previous encoded data. When the multiple raw data D_raw[1] to D_raw[8] (or even data of a greater volume) enter the DBI encoding device 200 at the same time, the DBI encoding device 200 may compare the raw data D_raw[1] to D_raw[8] at the same time to perform DBI encoding to generate the encoded data D_out[1] to D_out[8] and the DBI bits DB[1] to DB[8].

Figure 2:
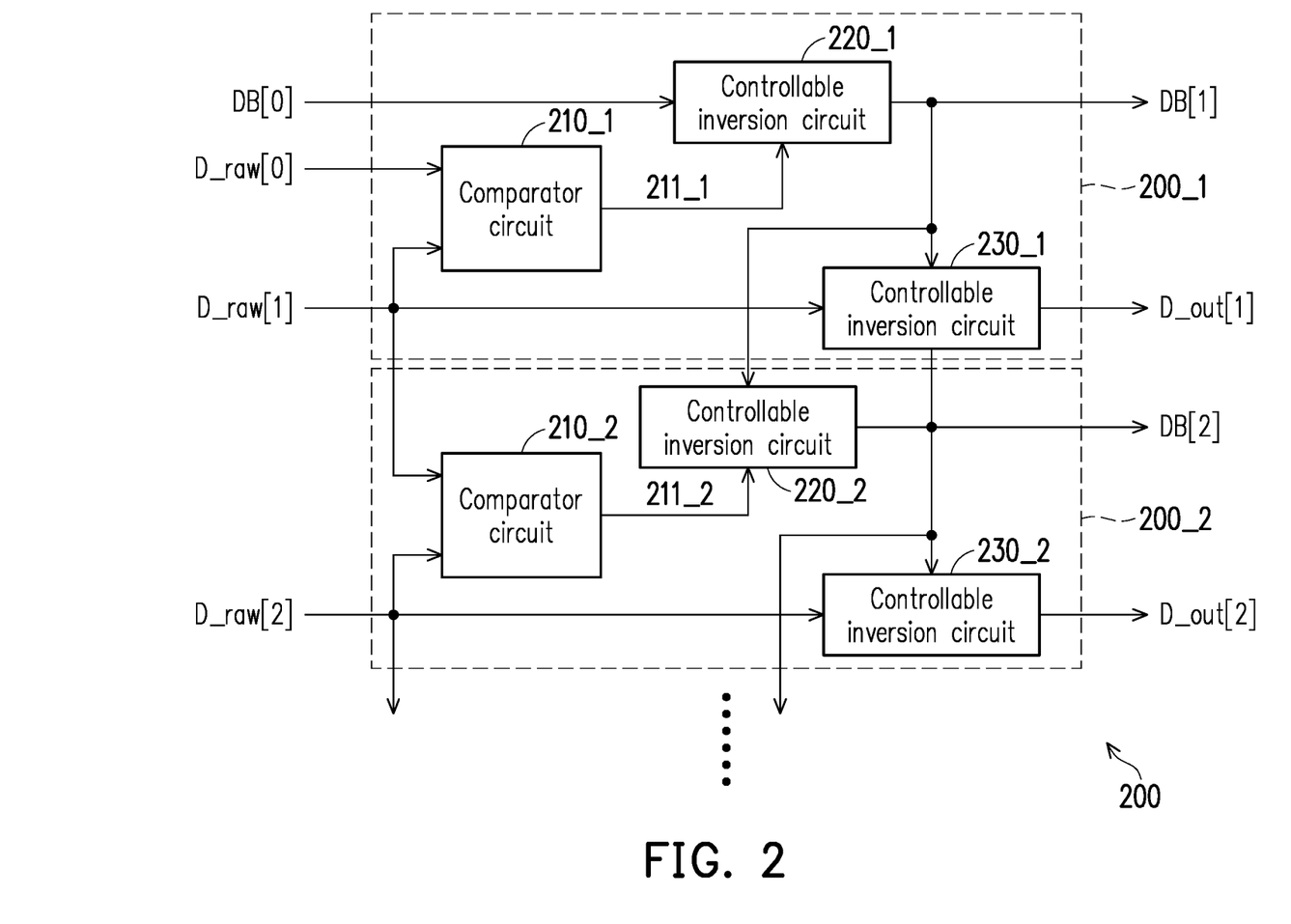
FIG. 2 is a schematic circuit block diagram illustrating a DBI encoding device according to an embodiment of the disclosure.

FIG. 2 is a schematic circuit block diagram illustrating the DBI encoding device 200 according to an embodiment of the disclosure. The DBI encoding device 200 shown in FIG. 2 may serve as one of various examples of the DBI encoding device 200 shown in FIG. 1. In the embodiment shown in FIG. 2, the DBI encoding device 200 includes one or more DBI encoding unit circuits, such as DBI encoding unit circuits 200_1, 200_2, . . . , as shown in FIG. 2. The specific number of DBI encoding unit circuits may be determined based on practical design. The DBI encoding unit circuits may perform DBI encoding on multiple raw data (e.g., D_raw[0], D_raw[1], D_raw[2], . . . ) to generate multiple encoded data (e.g., D_out[1], D_out[2], . . . ) and multiple DBI bits (e.g., DB[0], DB[1], DB[2], . . . ).

In the embodiment shown in FIG. 2, the DBI encoding unit circuit 200_1 of the DBI encoding device 200 includes a comparator circuit 210_1, a controllable inversion circuit 220_1, and a controllable inversion circuit 230_1. The comparator circuit 2101 may check a first different bit number between the raw data D_raw[0] and the raw data D_raw[1] (the number of the different bits between D_raw[0] and D_raw[1]), and compare the first different bit number with a reference value to obtain a comparison result 211_1. The reference value may be determined based on practical design. For example, the reference value may be a half of the bit number of the raw data (e.g., D_raw[0], D_raw[1], or D_raw[2]). Taking Table 1 as an example, the bit number of the raw data D_raw is 8, so the reference value may be 4. When the first different bit number is less than or equal to the reference value, the comparison result 211_1 is at a logic "False" (e.g., logic low level). When the first different bit number is greater than the reference value, the comparison result 211_1 is at a logic "True" (e.g., logic high level).

Based on different design requirements, in some embodiments, the DBI encoding device 200, the DBI encoding unit circuit 200_1, the comparator circuit 210_1, the controllable inversion circuit 220_1, and/or the controllable inversion circuit 230_1 may be implemented as hardware circuits. In some other embodiments, the DBI encoding device 200, the DBI encoding unit circuit 200_1, the comparator circuit 210_1, the controllable inversion circuit 220_1 and/or the controllable inversion circuit 230_1 may be implemented as firmware, software (i.e., programs), or a combination thereof. In yet some other embodiments, the DBI encoding device 200, the DBI encoding unit circuit 200_1, the comparator circuit 210_1, the controllable inversion circuit 220_1 and/or the controllable inversion circuit 230_1 may be implemented as a combination of multiple of hardware, firmware, and software.

In the case of hardware, the DBI encoding device 200, the DBI encoding unit circuit 200_1, the comparator circuit 210_1, the controllable inversion circuit 220_1, and/or the controllable inversion circuit 230_1 may be logic circuits implemented in an integrated circuit. For example, relevant functions of the DBI encoding device 200, the DBI encoding unit circuit 200_1, the comparator circuit 210_1, the controllable inversion circuit 220_1, and/or the controllable inversion circuit 230_1 may be implemented in one or more controllers, microcontrollers, microprocessors, ASICs, digital signal processors DSPs, field programmable gate arrays (FPGAs), and/or various logic blocks, modules, and circuits in other processing units. Relevant functions of the DBI encoding device 200, the DBI encoding unit circuit 200_1, the comparator circuit 210_1, the controllable inversion circuit 220_1, and/or the controllable inversion circuit 230_1 may be implemented as hardware circuits, such as various logic blocks, modules, and circuits in an integrated circuit by using hardware description languages, such as Verilog HDL or VHDL.

In the case of software and/or firmware, relevant functions of the DBI encoding device 200, the DBI encoding unit circuit 200_1, the comparator circuit 210_1, the controllable inversion circuit 220_1, and/or the controllable inversion circuit 230_1 may be realized as programming codes. For example, the DBI encoding device 200, the DBI encoding unit circuit 200_1, the comparator circuit 210_1, the controllable inversion circuit 220_1, and/or the controllable inversion circuit 230_1 may be realized by using a conventional programming language such as C, C++, or assembly language, or other suitable programming languages. The programming codes may be recorded/stored in a non-transitory computer readable medium. In some embodiments, the non-transitory computer-readable medium includes a semiconductor memory and/or a storage device, for example. The semiconductor memory includes a memory card, a read-only memory (ROM), a flash memory, a programmable logic circuit, or other semiconductor memories. An electronic apparatus (e.g., a central processing unit, a controller, a microcontroller, or a microprocessor) may read and execute the programming codes from the non-transitory computer readable medium, thereby realizing relevant functions of the DBI encoding device 200, the DBI encoding unit circuit 200_1, the comparator circuit 210_1, the controllable inversion circuit 220_1, and/or the controllable inversion circuit 230_1.

Figure 3:
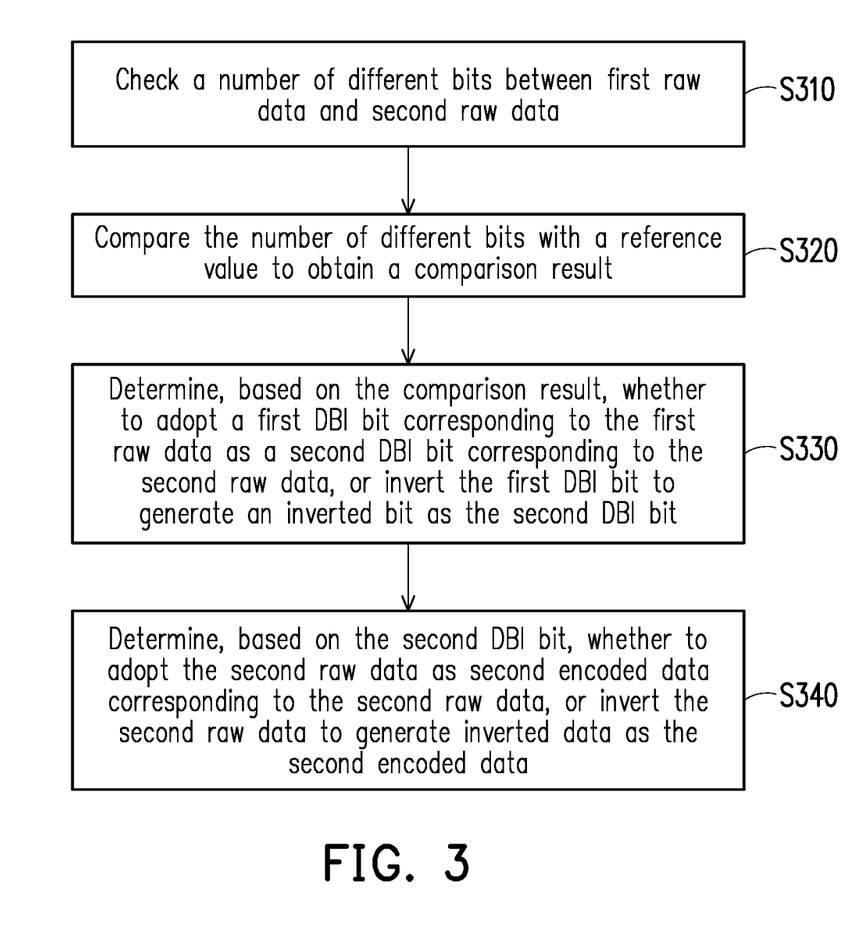
FIG. 3 is a flowchart illustrating a DBI encoding method according to an embodiment of the disclosure.

FIG. 3 is a flowchart illustrating a DBI encoding method according to an embodiment of the disclosure. Referring to FIGS. 2 and 3, in Step S310, the comparator circuit 210_1 may check the first different bit number between the raw data D_raw[0] and the raw data D_raw[1]. For example, assuming that the raw data D_raw[0] is "0000 0000" and the raw data D_raw[1] is "1111 1111", the first different bit number is 8. Assuming that the raw data D_raw[0] is "1111 1111" and the raw data D_raw[1] is "0101 0100", the first different bit number is 5. Assuming that the raw data D_raw[0] is "0000 0000" and the raw data D_raw[1] is "0000 0010", the first different bit number is 1.

In Step S320, the comparator circuit 210_1 may compare the first different bit number and the reference value to obtain the comparison result 211_1. Here, it is assumed that the bit number of the raw data D_raw is 8, and the reference value may be 4. Assuming that the raw data D_raw[0] is "0000 0000" and the raw data D_raw[1] is "1111 1111", the comparison result 211_1 is at a logic high level (because the first different bit number is 8). Assuming that the raw data D_raw[0] is "0000 0000" and the raw data D_raw[1] is "0000 0010", the comparison result 211_1 is at a logic low level (because the first different bit number is 1).

The controllable inversion circuit 220_1 is coupled to the comparator circuit 210_1 to receive the comparison result 211_1. The controllable inversion circuit 220_1 further receives the DBI bit DB[0] corresponding to the raw data D_raw[0], and outputs the DBI bit DB[1] corresponding to the raw data D_raw[1]. In Step S330, the controllable inversion circuit 220_1 determines, based on the comparison result 211_1, whether to adopt the DBI bit DB[0] as the DBI bit DB[1] or invert the DBI bit DB[0] to generate an inverted bit as the DBI bit DB[1]. For example, when the comparison result 211_1 indicates that the first different bit number is less than or equal to the reference value, the controllable inversion circuit 220_1 adopts the DBI bit DB[0] as the DBI bit DB[1]. When the comparison result 211_1 indicates that the first different bit number is greater than the reference value, the controllable inversion circuit 220_1 inverts the DBI bit DB[0] to generate an inverted bit as the DBI bit DB[1]. Assuming that the raw data D_raw[0] is "0000 0000" and the DBI bit DB[0] is "0", whereas the raw data D_raw[1] is "1111 1111", the controllable inversion circuit 220_1 inverts the DBI bit DB[0] "0" to generate the inverted bit "1" as the DBI bit DB[1] (because the first different bit number "8" is greater than the reference value "4"). Assuming that the raw data D_raw[0] is "0000 0000" and the DBI bit DB[0] is "1", whereas the raw data D_raw[1] is "0000 0010", the controllable inversion circuit 2201 adopts the DBI bit DB[0] "1" as the DBI bit DB[1] (because the first different bit number "1" is less than or equal to the reference value "4").

The controllable inversion circuit 230_1 is coupled to the controllable inversion circuit 220_1 to receive the DBI bit DB[1]. The controllable inversion circuit 230_1 receives the raw data D_raw[1] and outputs the encoded data D_out[1] corresponding to the raw data D_raw[1]. In Step S340, the controllable inversion circuit 230_1 determines, based on the DBI bit DB[1], whether to adopt the raw data D_raw[1] as the encoded data D_out[1] corresponding to the raw data D_raw[1] or invert the raw data D_raw[1] to generate inverted data as the encoded data D_out[1]. For example, when the DBI bit DB[1] is at the first logic value (e.g., logic low level), the controllable inversion circuit 230_1 adopts the raw data D_raw[1] as the encoded data D_out[1]. When the DBI bit DB[1] is at the second logic value (e.g., logic high level), the controllable inversion circuit 230_1 inverts the raw data D_raw[1] to generate inverted data as the encoded data D_out[1]. Assuming that the raw data D_raw[0] is "0000 0000" and the DBI bit DB[0] is "0" whereas the raw data D_raw[1] is "1111 1111", the DBI bit DB[1] is "1" (because the comparison result 211_1 indicates that the first different bit number "8" is greater than the reference value "4"), and the encoded data D_out[1] is the inverted data "0000 0000" of the raw data D_raw[1] (because the DBI bit DB[1] is 1). Assuming that the raw data D_raw[0] is "0000 0000" and the DBI bit DB[0] is "1" whereas the raw data D_raw[1] is "0000 0010", the DBI bit DB[1] is "1" (because the comparison result 211_1 indicates that the first different bit number "1" is less than or equal to the reference value "4"), and the encoded data D_out[1] is the inverted data "1111 1101" of the raw data D_raw[1] (because the DBI bit DB[1] is 1).

The DBI encoding unit circuit 200_2 includes a comparator circuit 210_2, a controllable inversion circuit 220_2 and a controllable inversion circuit 230_2. The comparator circuit 210_2 may check a second different bit number between the raw data D_raw[1] and the raw data D_raw[2](the number of the different bits between D_raw[1] and D_raw[2]), and compare the second different bit number with the reference value to obtain a comparison result 211_2. The controllable inversion circuit 220_2 is coupled to the comparator circuit 210_2 to receive the comparison result 211_2. The controllable inversion circuit 2202 is coupled to the controllable inversion circuit 220_1 to receive the DBI bit DB[1]. The controllable inversion circuit 220_2 outputs the DBI bit DB[2] corresponding to the raw data D_raw[2]. The controllable inversion circuit 220_2 determines, based on the comparison result 211_2, whether to adopt the DBI bit DB[1] as the DBI bit DB[2] or invert the DBI bit DB[1] to generate an inverted bit as the DBI bit DB[2]. The controllable inversion circuit 230_2 is coupled to the controllable inversion circuit 220_2 to receive the DBI bit DB[2]. The controllable inversion circuit 230_2 receives the raw data D_raw[2] and outputs the encoded data D_out[2] corresponding to the raw data D_raw[2]. The controllable inversion circuit 230_2 determines, based on the DBI bit DB[2], whether to adopt the raw data D_raw[2] as the encoded data D_out[2] or invert the raw data D_raw[2] to generate inverted data as the encoded data D_out[2]. Details of the DBI encoding unit circuit 200_2, the comparator circuit 210_2, the controllable inversion circuit 220_2, and the controllable inversion circuit 230_2 may be inferred with the same logic based on the description about the DBI encoding unit circuit 200_1, the comparator circuit 210_1, the controllable inversion circuit 220_1, and the controllable inversion circuit 230_1. Therefore, details in this regard will not be repeated in the following.

Details of other DBI encoding unit circuits (not shown in FIG. 2) of the DBI encoding device 200 may be inferred with the same logic based on the description about the DBI encoding unit circuit 200_1 and the DBI encoding unit circuit 200_2. Therefore, details in this regard will not be repeated in the following. Based on the above, each of the multiple DBI encoding unit circuits (e.g., 200_1, 200_2, ...) of the DBI encoding device 200 makes comparison on two raw data, instead of comparing encoded data and raw data. Therefore, the comparator circuits (e.g., 210_1, 210_2, ...) of the DBI encoding unit circuits do not need to wait for a decision/encoding on the previous encoded data.

How the controllable inversion circuits (e.g., 220_1, 220_2 ... and/or 230_1, 230_2, ...) are implemented may be determined based on practical design. For example, the controllable inversion circuits may be implemented with reference to relevant description about a controllable inversion circuit shown in FIG. 4, or a controllable inversion circuit shown in FIG. 5.

Figure 4:
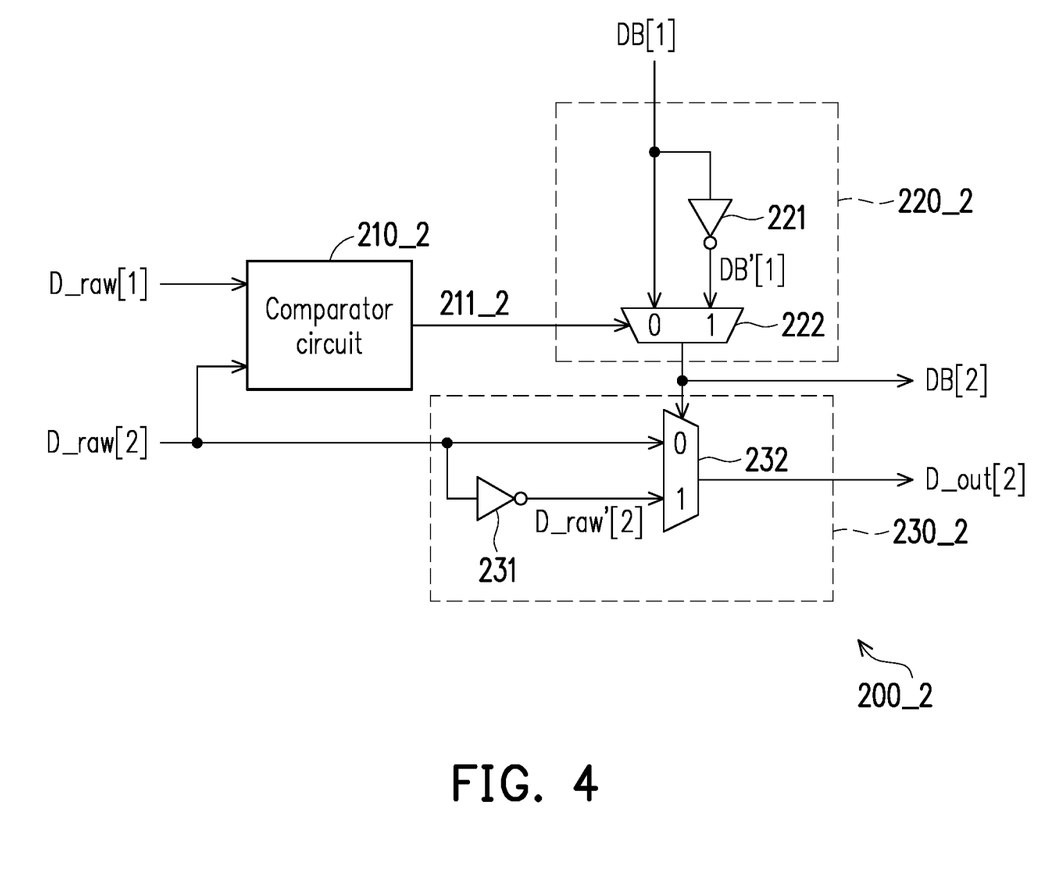
FIG. 4 is a schematic circuit block diagram illustrating a controllable inversion circuit according to an embodiment of the disclosure.

FIG. 4 is a schematic circuit block diagram illustrating a controllable inversion circuit according to an embodiment of the disclosure. The DBI encoding unit circuit 200_2 shown in FIG. 4 may serve as one of various examples of the DBI encoding unit circuit 200_2 shown in FIG. 2. Details of other DBI encoding unit circuits (e.g., 200_1) shown in FIG. 2 may be inferred with the same logic based on the description about the DBI encoding unit circuit 200_2 shown in FIG. 4. Therefore, details in this regard will not be repeated in the following.

In the embodiment shown in FIG. 4, the controllable inversion circuit 220_2 includes a NOT gate 221 and a multiplexer 222. The input end of the NOT gate 221 receives the DBI bit DB[1]. The NOT gate 221 may generate an inverted bit DB'[1] based on the DBI bit DB[1]. The first selection end of the multiplexer 222 receives the DBI bit DB[1]. The second selection end of the multiplexer 222 is coupled to the output end of the NOT gate 221 to receive the inverted bit DB'[1]. The control end of the multiplexer 222 is coupled to the comparator circuit 210_2 to receive the comparison result 211_2. The multiplexer 222 chooses, based on the comparison result 2212, one of the DBI bit DB[1] and the inverted bit DB'[1] as the DBI bit DB[2] to be provided to the controllable inversion circuit 230_2. For example, when the comparison result 211_2 indicates logic "0" (indicating that the different bit number between the raw data D_raw[1] and D_raw[2] is less than or equal to the reference value), the multiplexer 222 chooses to provide the DBI bit DB[1] to the controllable inversion circuit 230_2. When the comparison result 211_2 indicates logic "1" (indicating that the different bit number between the raw data D_raw[1] and D_raw[2] is greater than the reference value), the multiplexer 222 chooses to provide the inverted bit DB'[1] to the controllable inversion circuit 230_2.

In the embodiment shown in FIG. 4, the controllable inversion circuit 230_2 includes a inversion circuit 231 and a multiplexer circuit 232. The inversion circuit 231 receives the raw data D_raw[2]. The inversion circuit 231 generates inverted data D_raw'[2] based on the raw data D_raw[2]. For example, assuming that the raw data D_raw[2] is "0000 0010", the inverted raw data D_raw'[2] is "1111 1101". The multiplexer circuit 232 is coupled to the inversion circuit 231 to receive the inverted data D_raw'[2]. The multiplexer circuit 232 further receives the raw data D_raw[2]. The control end of the multiplexer circuit 232 is coupled to the controllable inversion circuit 220_2 to receive the DBI bit DB[2]. The multiplexer circuit 232 chooses, based on the DBI bit DB[2], one of the raw data D_raw[2] and the inverted data D_raw'[2] as the encoded data D_out[2]. For example, when the DBI bit DB[2] is at logic "0", the multiplexer circuit 232 chooses the raw data D_raw[2] as the encoded data D_out[2]. When the DBI bit DB[2] is at logic "1", the multiplexer circuit 232 chooses the inverted data D_raw'[2] as the encoded data D_out[2].

Figure 5:
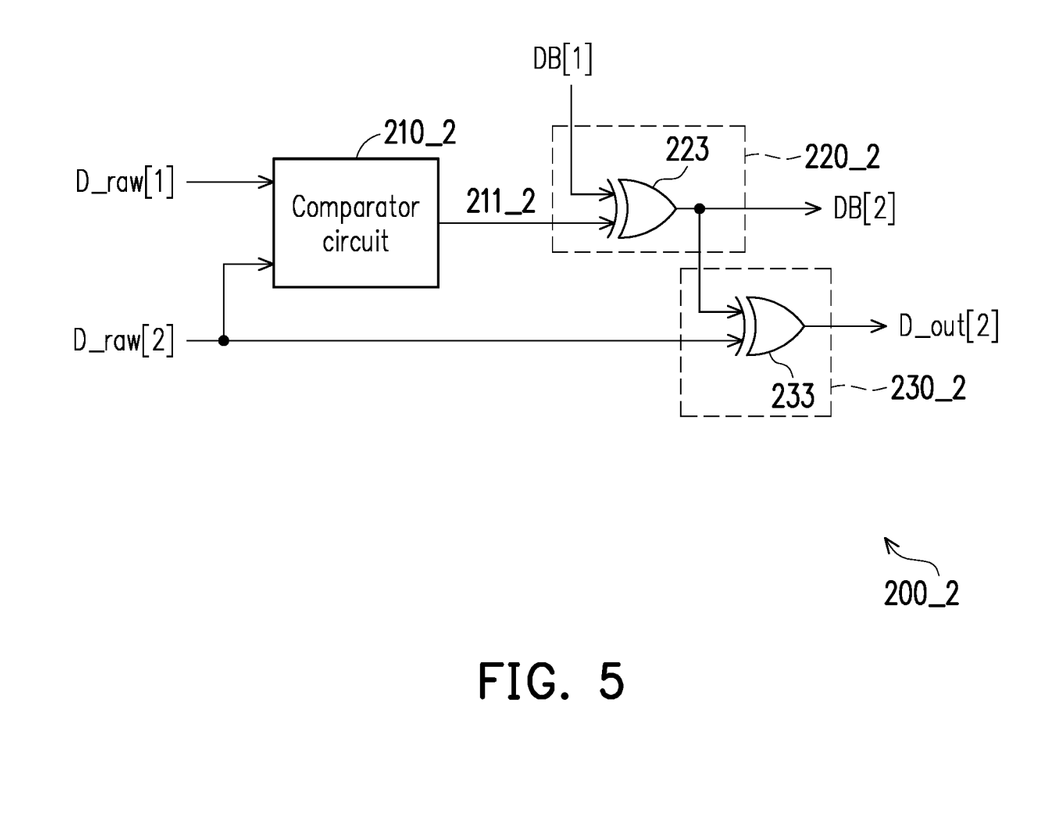
FIG. 5 is a schematic circuit block diagram illustrating a controllable inversion circuit according to another embodiment of the disclosure.

FIG. 5 is a schematic circuit block diagram illustrating a controllable inversion circuit according to another embodiment of the disclosure. The DBI encoding unit circuit 200_2 shown in FIG. 5 may serve as one of various examples of the DBI encoding unit circuit 200_2 shown in FIG. 2. Details of other DBI encoding unit circuits (e.g., 200_1) shown in FIG. 2 may be inferred with the same logic based on the description about the DBI encoding unit circuit 200_2 shown in FIG. 5. Therefore, details in this regard will not be repeated in the following.

In the embodiment shown in FIG. 5, the controllable inversion circuit 220_2 includes an exclusive-OR (XOR) gate 223. The first input end of the XOR gate 223 receives the DBI bit DB[1]. The second input end of the XOR gate 223 is coupled to the comparator circuit 210_2 to receive the comparison result 211_2. The XOR gate 223 generates the DBI bit DB[2] based on the DBI bit DB[1] and the comparison result 221_2. The output end of the XOR gate 223 provides the DBI bit DB[2] to the controllable inversion circuit 230_2.

In the embodiment shown in FIG. 5, the controllable inversion circuit 230_2 includes an XOR gate circuit 233. The XOR gate circuit 233 receives the raw data D_raw[2]. The XOR gate circuit 233 is coupled to the controllable inversion circuit 220_2 to receive the DBI bit DB[2]. The XOR gate circuit 233 generates and outputs the encoded data D_out[2] based on the raw data D_raw[2] and the DBI bit DB[2].

In view of the foregoing, each of the comparator circuits in the DBI encoding device 200 according to the embodiments compares two raw data, instead of comparing encoded data and raw data. Therefore, the comparator circuits do not need to wait for a decision/encoding on the encoded data. When multiple raw data enter the DBI encoding device 200 at the same time, the comparator circuits of the DBI encoding device 200 may compare the multiple raw data at the same time to perform DBI encoding to generate multiple encoded data.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data bus inversion (DBI) encoding device, configured to perform DBI encoding on a plurality of raw data to generate a plurality of encoded data, the DBI encoding device comprising:
a first comparator circuit, configured to check a first different bit number between a first raw data and a second raw data in the plurality of raw data, and compare the first different bit number with a first reference value to obtain a first comparison result;

a first controllable inversion circuit, coupled to the first comparator circuit to receive the first comparison result, wherein the first controllable inversion circuit receives a first DBI bit corresponding to the first raw data and outputs a second DBI bit corresponding to the second raw data, and the first controllable inversion circuit determines, based on the first comparison result, whether to adopt the first DBI bit as the second DBI bit or invert the first DBI bit to generate a first inverted bit as the second DBI bit; and a second controllable inversion circuit, coupled to the first controllable inversion circuit to receive the second DBI bit, wherein the second controllable inversion circuit receives the second raw data and outputs a second encoded data corresponding to the second raw data, and the second controllable inversion circuit determines, based on the second DBI bit, whether to adopt the second raw data as the second encoded data or invert the second raw data to generate a first inverted data as the second encoded data.

2. The DBI encoding device as claimed in claim 1, wherein:
the first controllable inversion circuit adopts the first DBI bit as the second DBI bit when the first comparison result indicates that the first different bit number is less than or equal to the first reference value; and
the first controllable inversion circuit inverts the first DBI bit to generate the first inverted bit as the second DBI bit when the first comparison result indicates that the first different bit number is greater than the first reference value.

3. The DBI encoding device as claimed in claim 1, wherein:
the second controllable inversion circuit adopts the second raw data as the second encoded data when the second DBI bit is a first logic value; and
the second controllable inversion circuit inverts the second raw data to generate the first inverted data as the second encoded data when the second DBI bit is a second logic value.

4. The DBI encoding device as claimed in claim 1, wherein the first reference value is a half of a bit number of the first raw data or the second raw data.

5. The DBI encoding device as claimed in claim 1, wherein the first controllable inversion circuit comprises:
a NOT gate, having an input end receiving the first DBI bit; and
a multiplexer, having a first selection end receiving the first DBI bit, wherein a second selection end of the multiplexer is coupled to an output end of the NOT gate to receive the first inverted bit, a control end of the multiplexer is coupled to the first comparator circuit to receive the first comparison result, and a common end of the multiplexer provides the second DBI bit to the second controllable inversion circuit.

6. The DBI encoding device as claimed in claim 1, wherein the first controllable inversion circuit comprises:
an XOR gate, having a first input end receiving the first DBI bit, wherein a second input end of the XOR gate is coupled to the first comparator circuit to receive the first comparison result, and an output end of the XOR gate provides the second DBI bit to the second controllable inversion circuit.

7. The DBI encoding device as claimed in claim 1, wherein the second controllable inversion circuit comprises:

an inversion circuit, configured to receive the second raw data to generate the first inverted data; and
a multiplexer circuit, configured to receive the second raw data, wherein the multiplexer circuit is coupled to the inversion circuit to receive the first inverted data, a control end of the multiplexer circuit is coupled to the first controllable inversion circuit to receive the second DBI bit, and the multiplexer circuit chooses, based on the second DBI bit, one of the second raw data and the first inverted data as the second encoded data.

8. The DBI encoding device as claimed in claim 1, wherein the second controllable inversion circuit comprises:
an XOR gate circuit, configured to receive the second raw data, wherein the XOR gate circuit is coupled to the first controllable inversion circuit to receive the second DBI bit, and the XOR gate circuit outputs the second encoded data.

9. The DBI encoding device as claimed in claim 1, further comprising:
a second comparator circuit, configured to check a second different bit number between the second raw data and a third raw data in the plurality of raw data, and compare the second different bit number with a second reference value to obtain a second comparison result;
a third controllable inversion circuit, coupled to the second comparator circuit to receive the second comparison result, wherein the third controllable inversion circuit is coupled to the first controllable inversion circuit to receive the second DBI bit, the third controllable inversion circuit outputs a third DBI bit corresponding to the third raw data, and the third controllable inversion circuit determines, based on the second comparison result, whether to adopt the second DBI bit as the third DBI bit or invert the second DBI bit to generate a second inverted bit as the third DBI bit; and
a fourth controllable inversion circuit, coupled to the third controllable inversion circuit to receive the third DBI bit, wherein the fourth controllable inversion circuit receives the third raw data and outputs a third encoded data corresponding to the third raw data, and the fourth controllable inversion circuit determines, based on the third DBI bit, whether to adopt the third raw data as the third encoded data or invert the third raw data to generate a second inverted data as the third encoded data.

10. A data bus inversion (DBI) encoding method for performing DBI encoding on a plurality of raw data to generate a plurality of encoded data, the DBI encoding method comprising:
checking a first different bit number between a first raw data and a second raw data in the plurality of raw data;
comparing the first different bit number and a first reference value to obtain a first comparison result;
determining, based on the first comparison result, whether to adopt a first DBI bit corresponding to the first raw data as a second DBI bit corresponding to the second raw data or invert the first DBI bit to generate a first inverted bit as the second DBI bit; and
determining, based on the second DBI bit, whether to adopt the second raw data as a second encoded data corresponding to the second raw data or invert the second raw data to generate a first inverted data as the second encoded data.

11. The DBI encoding method as claimed in claim 10, further comprising:

adopting the first DBI bit as the second DBI bit when the first comparison result indicates that the first different bit number is less than or equal to the first reference value; and inverting the first DBI bit to generate the first inverted bit as the second DBI bit when the first comparison result indicates that the first different bit number is greater than the first reference value.

12. The DBI encoding method as claimed in claim 10, further comprising:

adopting the second raw data as the second encoded data when the second DBI bit is a first logic value; and inverting the second raw data to generate the first inverted data as the second encoded data when the second DBI bit is a second logic value.

13. The DBI encoding method as claimed in claim 10, wherein the first reference value is a half of a bit number of the first raw data or the second raw data.

14. The DBI encoding method as claimed in claim 10, further comprising:

generating the first inverted bit based on the first DBI bit by a NOT gate; and choosing one of the first DBI bit and the first inverted bit as the second DBI bit based on the first comparison result by a multiplexer.

15. The DBI encoding method as claimed in claim 10, further comprising:

generating the second DBI bit based on the first DBI bit and the first comparison result by an XOR gate.

16. The DBI encoding method as claimed in claim 10, further comprising:

generating the first inverted data based on the second raw data by an inversion circuit; and choosing one of the second raw data and the first inverted data as the second encoded data based on the second DBI bit by a multiplexer circuit.

17. The DBI encoding method as claimed in claim 10, further comprising:

generating the second encoded data based on the second raw data and the second DBI bit by an XOR gate circuit.

18. The DBI encoding method as claimed in claim 10, further comprising:

checking a second different bit number between the second raw data and a third raw data in the plurality of raw data;

comparing the second different bit number and a second reference value to obtain a second comparison result;

determining, based on the second comparison result, whether to adopt the second DBI bit as a third DBI bit corresponding to the third raw data or invert the second DBI bit to generate a second inverted bit as the third DBI bit; and determining, based on the third DBI bit, whether to adopt the third raw data as a third encoded data corresponding to the third raw data or invert the third raw data to generate a second inverted data as the third encoded data.

\* \* \* \* \*